United States Patent [19]

Stevens et al.

[11] Patent Number: 4,953,757
[45] Date of Patent: Sep. 4, 1990

[54] FRONT RACK FOR A TRUCK

[76] Inventors: James R. Stevens; Jodi Stevens, both of 515 Douglas St., Tillamook, Oreg. 97141

[21] Appl. No.: 365,703

[22] Filed: Jun. 14, 1989

[51] Int. Cl.⁵ .......................... B60R 9/00; B60P 3/10
[52] U.S. Cl. .................................... 224/310; 414/462; 224/321
[58] Field of Search ................ 224/310, 309, 317, 321, 224/329; 414/462; 296/3

[56] References Cited
U.S. PATENT DOCUMENTS

| | | | |
|---|---|---|---|
| 3,702,210 | 11/1971 | Farrugie | 296/3 |
| 3,734,321 | 5/1973 | Long et al. | 224/310 |
| 4,239,438 | 12/1980 | Everson | 224/310 |
| 4,603,798 | 8/1986 | Griswold | 224/310 |

Primary Examiner—Linda J. Sholl
Attorney, Agent, or Firm—Richard C. Litman

[57] ABSTRACT

A truck rack mounted over the cab allows for front loading. A ramp lowers down to allow for easy loading. A winch and pulley can be provided for easing the actual lifting of the load along the ramp. The ramp lifts back up to hold the load in place above the cab.

7 Claims, 3 Drawing Sheets

4,953,757

FRONT RACK FOR A TRUCK

BACKGROUND OF THE INVENTION

1. Field of the Invention

The present invention relates to racks mounted on vehicles. More specifically the invention is for the purpose of easily loading a large object, such as a boat, on top of a truck. The present invention allows for easy front loading with the provided truck rack.

2. Description of the Prior Art

The following patents are felt to relate to the present invention, but in no way, either singly or in combination, disclose the applicant's unique invention.

U.S. Pat. No. 3,972,433 issued to Reed is pertinent for its disclosure, in FIGS. 2 and 7, of a tiltable rack section for boad loading, even though access is achieved from the rear of a pickup truck.

U.S. Pat. No. 2,901,286 issued to Harris discloses a rack for trucks assembled on the truck bed and constructed of aluminum tubes, with a slidable canopy and a pulley system for raising and lowering the canopy.

U.S. Pat. No. 4,603,798 issued to Griswold discloses a car top carrier designed for loading boats on the rack from the front and comprising a three-point support system on the front bumper, the apex of the system being used as a pivot point for loading.

None of the above cited references shows a front loading lowerable truck rack.

SUMMARY OF THE INVENTION

The present invention comprises a front mounted truck rack for loading large objects. The rack is mounted over the truck cab and engine hood. The support posts are attached to the front bumper and the front end of a truck bed. The rack top section is pivotably mounted towards the rear so as to be able to lower the front end down, allowing easy loading of a large object by pushing or pulling it up the pivoted ramp.

The rack comes in separate welded sections that are then assembled with the appropriate nuts and bolts to form the complete rack device on the truck. The device can be installed by one or two people and with relatively cheap cost. Intended items to be carried include boats of all sorts, rowboats, canoes, sailboats, etc. Large bulk items not able to fit into the bed of a small truck could also be carried using the rack. Such items would include lumber, poles, platforms and frames for construction purposes.

The pivoted ramp can be loaded manually or a special winch and pulley can be used to hoist and lower the load. The winch is secured on the rear section of the frame with a line leading over the top of the frame and extending to the front of the load. An alternative method of raising the ramp includes the use of a geared shaft and nut assembly in the bumper assembly. An electric motor would turn the shafts to raise or lower the ramp.

Accordingtly, it is one object of the present invention to provide a front loading raised truck rack.

It is another object of the present invention to provide a raised truck rack with a front section that lowers for easy loading.

It is a further object of the present invention to provide a front loading truck rack that is easy to install and simple in construction.

It is yet another object of the present invention to provide a front loading truck rack that is easy to disassemble for storage when not in use.

It is yet still a further object of the invention to provide a front loading truck rack that includes a powered mechanical means to load and unload the rack.

These and other objects of the invention will readily become apparent upon further review of the attached drawings and specification.

DESCRIPTION OF THE PREFERRED EMBODIMENT

Figure 1:
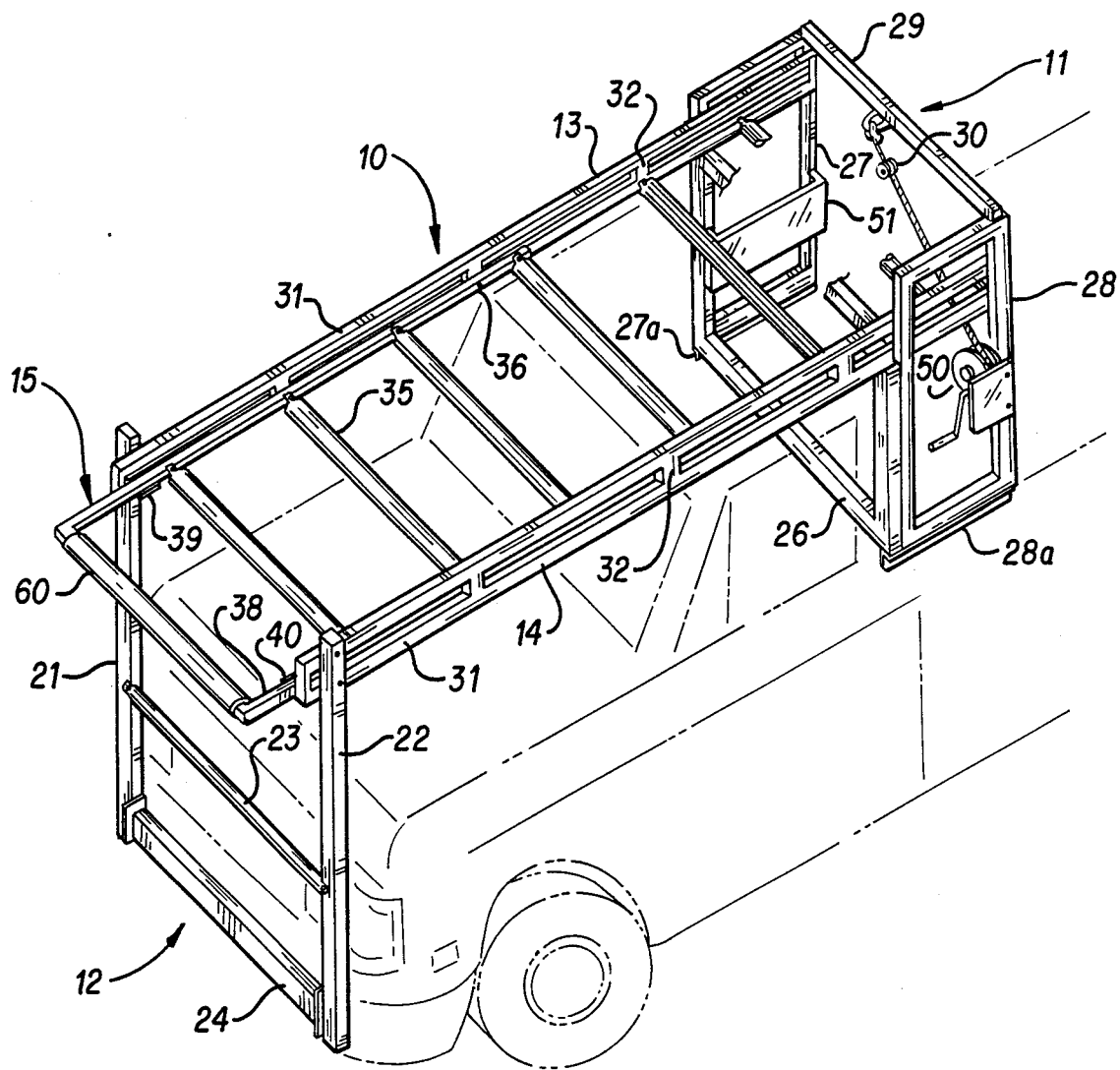
FIG. 1 shows a perspective view of the truck rack frame mounted on top of a pickup truck with the rear frame in partial section.

The frame of the truck rack 10 is shown in FIG. 1. It consists of bed frame 11, bumper assembly 12, horizontal frames 13, 14 and the pivoted ramp 15. Each of these form a subassembly of the rack 10. These subassemblies are pre-welded together and are then fastened to each other by nuts, washers and bolts. The rack frame shown here in the drawings in constructed of steel tubing for a strong, sound construction. Alternate materials such as aluminum, stainless steel, plastic, fiberglas, etc. can be used just as effectively. Certain materials could be chosen over others if weight factors are a strong consideration.

Figure 2:
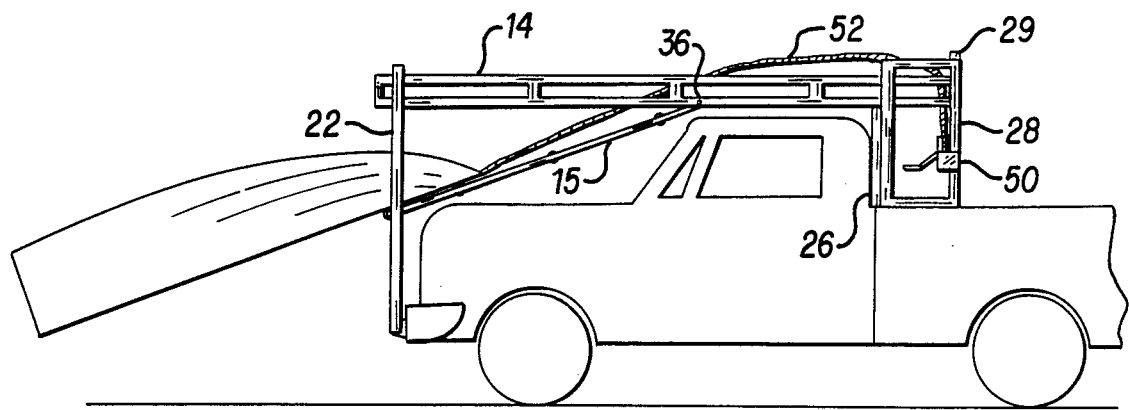
FIG. 2 shows a side view of the rack mounted on a pickup truck with the rack in the lowered position.

The bed frame 11 comprises two side sections 27, 28 and a front section 26. The bottom of bed frame sections 27 and 28 are bolted to either side of the pickup bed 90 by means of flanges 27a and 28a. Frame section 26 is bolted between the front of frame sections 27, 28. The bottom of the bed frame should be about even. Placed on top of the horizontal side frame structure 13, 14 is a pulley bar 29 to which a pulley can be used to help haul up a load onto the rack 10 by threading a rope through it and tying it to the load, as shown in FIG. 2.

Bumper assembly 12 consists of side posts 21 and 22 and bottom crosspiece 24. A center crosspiece 23 serves to limit the lowering of ramp 15. The bumper assembly 12 is mounted by bolting crosspiece 24 to the bumper of the truck. The existing bumper bolts can be used to do this.

The horizontal side frames 13, 14 consist of long members 31 joined by short crosspieces 32. The front end of each frame 13, 14 is bolted to the top of the bumper posts 21, 22. A K-bracket can be used for this purpose or the horizontal side frames 13, 14 can be bolted directly to the bumper posts 21, 22 as shown in the drawings. The drawing shows them mounted on the inside of the post structure, but they could just as well be mounted to the outside. The dimensions of the various frame assemblies could be made to accommodate either way. The rear of the side frames 13, 14 are bolted to the top of the bed frame members 27, 28. Note that side frames 13, 14 go over bed frame member 26.

Figure 3:
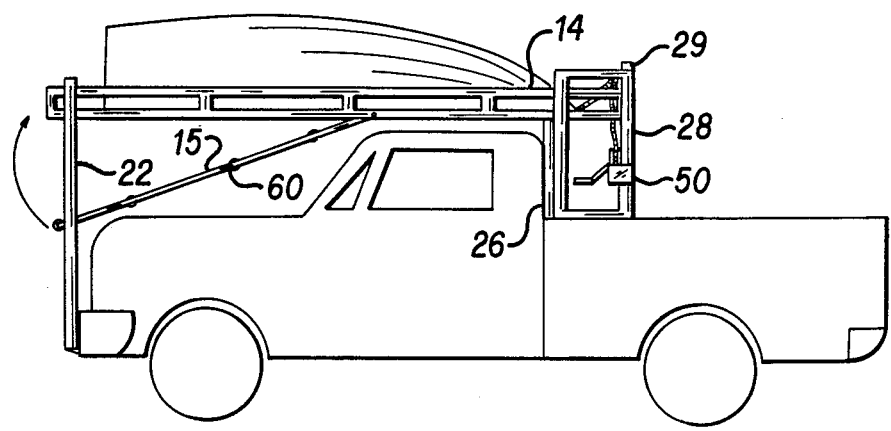
FIG. 3 is a side view of the rack frame with the load mounted.

The ramp 15 consists of two side members 37, 38 with crosspieces 35 holding the side members 37, 38 together. The ramp 15 fits snugly in-between the bottom of side frame members 13, 14. Pivot bolts 36 go through the lower horizontal side frame member 31 and ramp side member 37 or 38. This now allows the ramp 15 to pivot downwardly. Crosspiece 23 prevents the ramp 15 from striking the truck hood. In the lowered position the rack can be easily loaded as shown in FIG. 2. With a rope tied to the load, the pulley 30 can be used to hoist up the load as shown in FIG. 3. The ramp 15 is then raised up and held in place by stop lock plates 39, 40.

An additional feature is the winch 50 and outboard motor mount 51 fastened to one of the bed frame members 27, 28. Motor mount 51 can be used to store the motor to a boat that is loaded on the rack 10. Rope 52 is wound around winch 50 and put through pulley 30. The addition of the winch aids in hauling heavy loads up the ramp 15. An electric winch is also another possible addition to make loading very heavy objects onto the rack as easy as possible. The electric winch could be mounted on plate 51.

Rollers 60 can be included with ramp 15. They consist of hollow tubing concentrically disposed around the crosspieces 35. The rollers 60 would allow for ease in loading by reducing the friction on the ramp to be overcome. Any other conventional means for easing the loading could be utilized.

Figure 4:
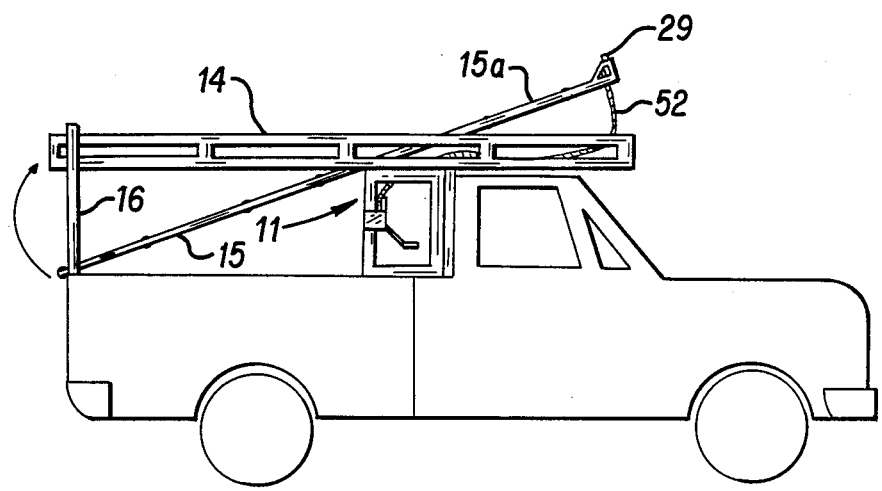
FIG. 4 shows an alternate rear bed loading rack.

The rack 10 does not need to be limited to a front-loaded device. The ramp 15 can be lowered into the bed of the truck as shown in FIG. 4. The ramp 15 shown here is an alternate form of ramp in that the ramp 15 has a back section 15a that also pivots. The pulley bar 29 would be included on this pivoting back section 15a of the ramp 15. This extended ramp could be included on the normal front loading racks shown previously. The frame remains essentially similar to the one shown for the front loading device 10. The bed frame assembly 11 is essentially the same. The bumper assembly 12 has been replaced by a rear bed assembly 16. The pivot bolts 36 are mounted near the bed assembly 11.

Figure 5:
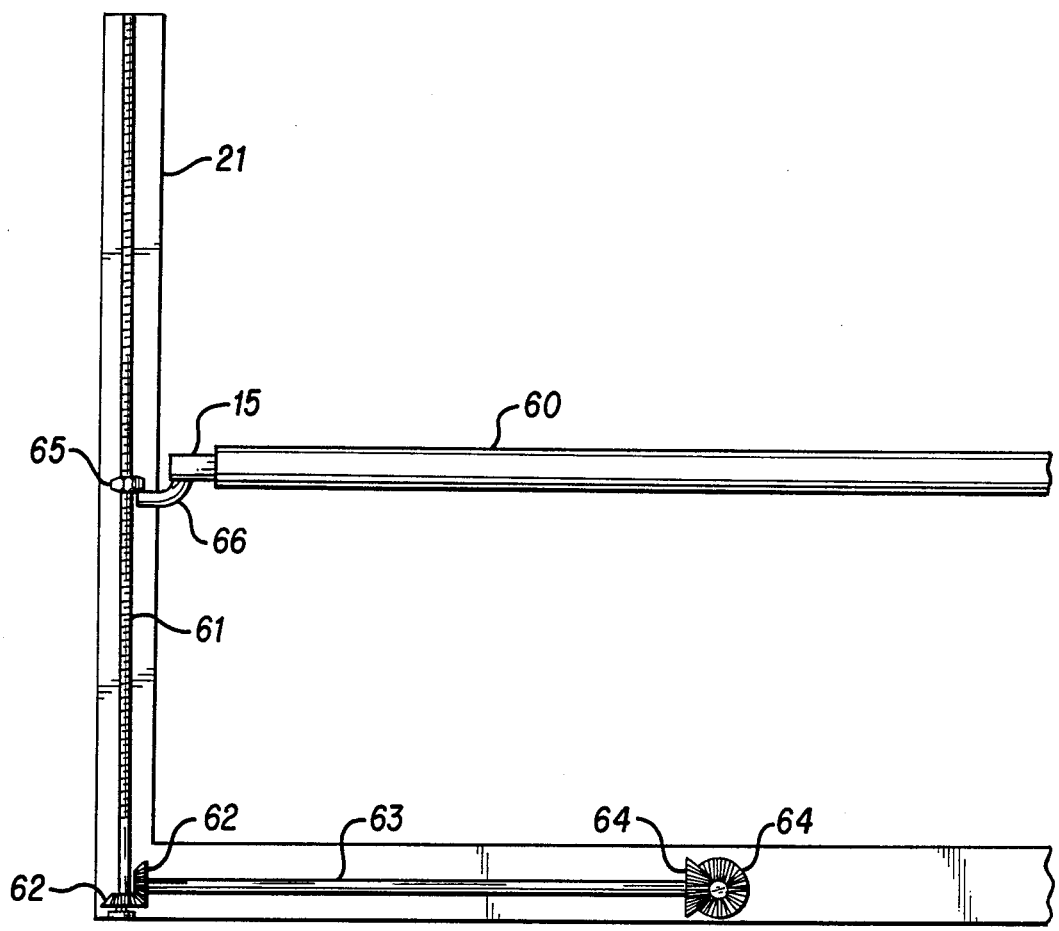
FIG. 5 shows a ramp raising shaft and gear assembly in the bumper assembly.

Another form of ramp lifting and lowering device is shown in FIG. 5. The bumper posts 21, 22 have placed inside them threaded shafts 61 having helical gears on the bottom end. Crosspiece 24 has a shaft 63 connected to shaft 61 by means of gears 62. At the other end of shaft 63 is another helical gear 64 that connects to a power unit such as an electric motor. Placed around shaft 61 is a threaded nut 65 with lever 66 attached to it. Posts 21, 22 would have a slot up and down their length to allow lever 66 to move up and down the length of the shaft 61 as nut moved due to rotation of the threaded shaft 61 supplied by gearing 63, 64. Ramp 15 would rest on the lever 66 and thus be raised or lowered with the nut 65 and lever 66. Post 22 would have a similar assembly to the one shown for post 21.

It is to be understood that the present invention is not limited to the sole embodiment described above, but encompasses any and all embodiments within the scope of the following claims:

I claim:
1. A front loading truck rack comprising:
    a bed frame assembly mounted immediately behind the cab of a truck;
    a vertical bumper post assembly mounted to the bumper in front of said truck;
    a horizontal frame assembly horizontally disposed between said bed frame assembly and said bumper assembly and attached thereto, said horizontal frame assembly mounted over the truck cab;
    ramp means pivotably mounted to said horizontal frame assembly in front of said truck cab, said ramp means being lowerable so that a load can be disposed on top of the ramp means and lifted up easily and without great difficulty;
    said bed frame, bumper post, horizontal frame and ramp assemblies are formed from hollow tubing;
    said bed frame comprises two parallel rectangular bed side frames and one rectangular bed front frame connecting said two side frames;
    said bumper post assembly comprises two parallel vertical posts, a lower post cross member disposed and attached between the bottom of said posts, and a middle post cross member disposed and attached between the middle of said posts to prevent said ramp means from resting on the hood of a vehicle;
    said horizontal frame assembly comprises two parallel elongated side frame members, each elongated side frame member attached to one of said vertical posts and one of said bed side frames;
    said ramp means comprising two parallel ramp side members, and ramp cross members disposed between said ramp side members, said ramp side members are disposed between and pivotably mounted at a pivot point to an adjacent horizontal side frame member;
    threaded shafts mounted inside said bumper posts;
    threaded nuts mounted around said threaded shafts;
    longitudinal slots on said bumper posts;
    lever means affixed to said threaded nuts and extending through said bumper post slots, said ramp means resting atop said lever means, said lever for lifting up or lowering said ramp means;
    gearing mounted on a lower end of said bumper post shaft;
    threaded shafts mounted inside said middle post cross member, said middle post cross member shafts having gearing at one end intermeshing with said gearing on said bumper post shafts, said middle post cross member shafts having gearing at an opposite end;
    drive gear mounted in the center of said middle post cross member and intermeshing with said gearing on said opposite ends of said middle post cross member shafts, such that when said drive gear is rotated said middle post cross member shafts and said bumper post shafts rotate raising or lowering said nut and therefore raising or lowering said ramp means.

2. The front loading truck rack according to claim 1, including:
    loading means mounted on said ramp means to aid in loading the truck rack.

3. The front loading truck rack according to claim 2, wherein:
    said loading means comprises hollow tubing surrounding each said ramp cross member, said hollow tubing acting as rollers.

4. The front loading truck rack according to claim 1, including:
    winch means mounted to said bed frame assembly;
    pulley means affixed to an upper portion of said bed frame assembly; and
    said winch means and said pulley means having a rope or line wrapped around said winch means and threaded through said pulley means for hoisting up loads onto and along said ramp means.

5. The front loading truck rack according to claim 1, wherein:
   said ramp side members extend from one side of said pivot point only, said one side being generally over said truck cab.

6. The front loading truck rack according to claim 1, wherein:
   said ramp side members extend from two sides of said pivot point.

7. A front loading truck rack for a truck having a cab with front and rear portions and a hood, including:
   a bed frame assembly mounted immediately behind the cab of a truck;
   a vertical bumper post assembly mounted to the bumper in front of said truck;
   a horizontal frame assembly horizontally disposed between said bed frame assembly and said bumper assembly and attached thereto, said horizontal frame assembly mounted over the truck cab;
   ramp means pivotably mounted to said horizontal frame assembly and lowerable in front of said truck cab, said ramp means being lowerable so that a load can be disposed on top of the ramp means and lifted up over the hood and cab of a truck easily and without great difficulty;
   said bed frame, bumper post, horizontal frame and ramp assemblies are formed from hollow tubing;
   said bed frame comprises two parallel rectangular bed side frames and one rectangular bed front frame connecting said two side frames;
   said bumper post assembly comprises two parallel vertical posts, a lower post cross member disposed and attached between the bottom of said posts, and a middle post cross member disposed and attached between the middle of said posts to prevent said ramp means from resting on the hood of a vehicle;
   said horizontal frame assembly comprises two parallel elongated side frame members, each elongated side frame member attached to one of said vertical posts and one of said bed side frames;
   said ramp means comprising two parallel ramp side members, and ramp cross members disposed between said ramp side members, said ramp side members are disposed between and pivotably mounted at a pivot point to an adjacent horizontal side frame member, said pivot point disposed in front of the rear portion of the truck cab and over the area including the hood and cab so that said ramp means pivots down over the cab and hood.

* * * * *